Nov. 23, 1937.  F. KURZ  2,099,854
ELECTRICITY METER
Filed Dec. 29, 1934
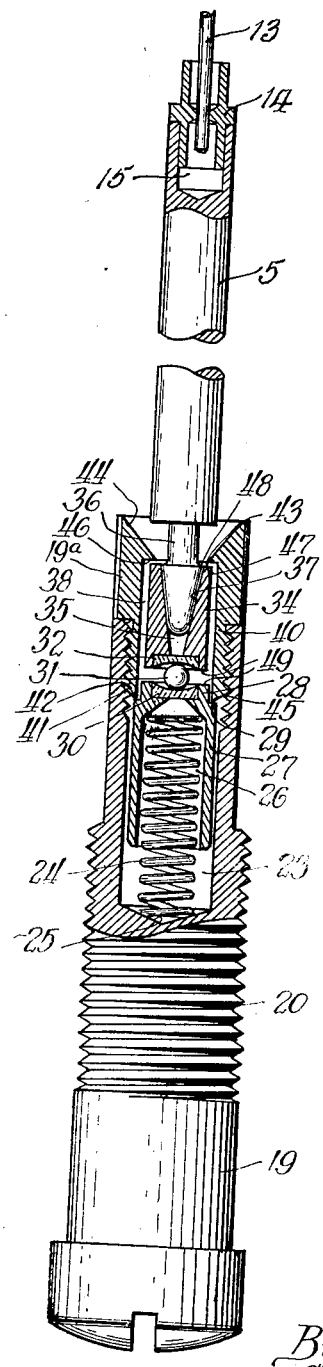
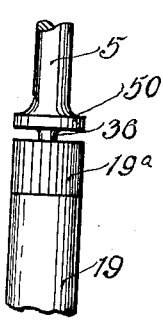
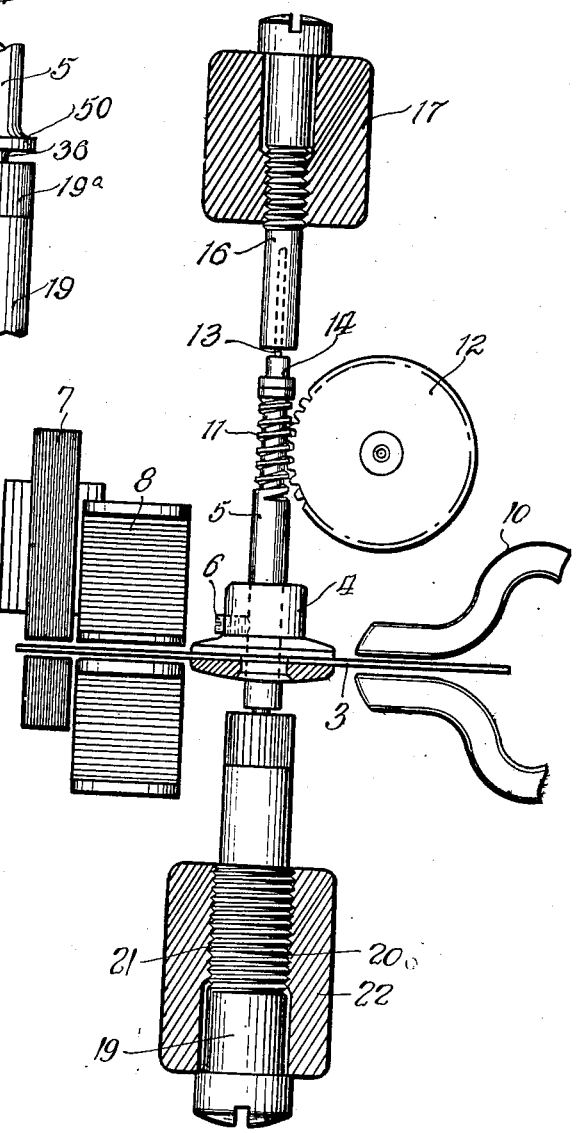
Inventor:
Fred Kurz
By Brown, Jackson, Boettcher & Dienner
Attys.

Patented Nov. 23, 1937

2,099,854

UNITED STATES PATENT OFFICE 2,099,854

ELECTRICITY METER

Fred Kurz, Springfield, Ill., assignor to Sangamo Electric Company, Springfield, Ill., a corporation of Illinois Application December 29, 1934, Serial No. 759,651

10 Claims. (Cl. 308—159)

This invention relates broadly to electricity meters. More specifically, the invention has to do with antifriction bearings for use in integrating meters of all types, and especially in meters of the induction watt-hour type. Briefly, meters of this type generally comprise an aluminum meter disc fixedly secured to a spindle. Coacting with this disc is a shunt connected electromagnet and a series connected electromagnet, the torque being obtained by the interaction of the disc with the magnetic fluxes from the shunt and series coils.

The general object of the invention is to provide an improved construction of lower bearing for the spindles of these electric meters. The lower bearing carries substantially the entire weight of the moving system of the meter, i. e., the weight of the spindle, the disc and the worm wheel. The major load imposed on this bearing is the vertical thrust load of the weight of the moving system, although some appreciable radial loads are imposed on the bearing at times, particularly when severe current loads are passing through the meter. The actual bearing surfaces are of the jewel type, and it is important that these surfaces be protected against cracking, scratching, or marring in any way, such as would impair their anti-friction characteristics. Hence, it is important that these bearing surfaces be protected against injury arising from rough handling of the meter during shipment, dropping the same, etc. While the weight of the moving system of the meter is comparatively small, nevertheless in any severe jar or shock of the instrument the inertia of this moving system may be sufficient to cause injury to the rather delicate bearing surfaces, particularly when acting downwardly in a substantially straight thrust line.

One of the principal objects of the present invention is to provide an improved construction of spring-cushioned lower bearing for electric meters of the general types above described. The spring cushioned mounting of the bearing assembly, including the jeweled bearing surfaces, effectively absorbs the abnormal stresses incident to sudden jar or shock of the meter and prevents these abnormal forces causing any injury to the actual bearing surfaces. While spring-cushioned lower bearings for electric meters are not broadly new, the construction of my invention incorporates distinctive improvements over prior constructions known to me, which improvements will appear from the subsequent detailed description of my invention.

Another object of the invention is to provide an improved bearing of the ball type wherein a thrust load ball is interposed between upper and lower bearing jewels. One of the features of this construction is that the ball and the upper and lower bearing jewels are spring-cushioned against shock so as to minimize the likelihood of their surfaces being injured by rough handling or severe jarring of the meter. Another and very important feature of this construction is that the entire assembly is self-contained in unit form, with the jewels, their mounting members, the ball and the cushioning spring all enclosed within a bearing housing or cage, and retained therein against the possibility of accidental loss or separation. An important advantage of this construction is that it minimizes the amount of handling of the steel balls with the fingers. It has been determined that handling the balls with the fingers promotes rusting thereof. In making replacements in constructions where the balls must be handled separately, the likelihood of contaminating the balls, with subsequent rusting thereof, is an objectionable factor. In my improved construction, after the bearing parts have been assembled, they remain as a self-contained unit and can be handled and replaced as such without any separate handling of the balls.

Another important advantage of this construction is that there is no possibility of loss of the balls, the cup jewels or any other component parts in the handling, assembling and replacing of bearings, and the balls are always retained in their properly centered relation between the upper and lower cup jewels.

Further objects and advantages of the invention will appear from the following detailed description when taken in connection with the accompanying drawing, in which:

Figure 1 is a front elevation, partly in section, of such parts of an induction watt-hour meter as are necessary to a clear understanding of my invention;

Figure 2 is a vertical sectional view of my improved lower bearing, on a comparatively large scale; and Figure 3 is a fragmentary elevational view of a modified construction.

Referring now in detail to the drawing, 3 indicates an aluminum disc which is rigidly secured to a hub 4. This hub is mounted on and rigidly secured to a spindle 5, as by means of a set screw 6. Disc 3 is adapted to rotate between a shunt connected electromagnet 7 and a series connected electromagnet 8, the torque being obtained by interaction of the disc with the magnetic fluxes from the shunt and series coils. The speed of disc 3 is controlled by a permanent damping magnet 10, and spindle 5 has a worm 11 cut therein for cooperation with a worm wheel 12, which wheel forms a part of the integrating train for transmitting motion of the disc 3 to the meter dials.

At its upper end, spindle 5 is pivotally mounted upon a pivot pin 13. This pin is preferably made of highly tempered steel wire and is usually of sufficiently small diameter to be slightly flexible throughout its length. As shown, one end of pin 13 extends downwardly into a bushing 14, secured in a bore 15 in the upper end of spindle 5, and at its other end, pin 13 extends into and is suitably secured in a bearing screw 16. This screw is adapted to be threaded into and held by some stationary part 17 of the meter, such, for example, as the meter frame or housing.

The lower bearing for spindle 5 comprises a bearing screw 19 which is externally threaded at 20 for cooperation with internal threads 21 formed on some stationary part 22 of the meter, such, for example, as the meter frame or housing. This bearing screw is provided with a central longitudinal bore or cavity 23, which extends downwardly from the upper end thereof, forming part of a housing for the reception of component parts of the bearing system. These parts comprise a compression spring 24, the lower end of which seats on floor 25 of bore 23, and the upper end of which extends upwardly into a central longitudinal bore 26 of a lower bearing mounting 27. This bearing mounting is preferably reduced in diameter as indicated at 28 to form an abutment shoulder 29 and on its upper surface is provided with a cup jewel 30, this jewel being preferably set into a recess in which it is secured in any preferred manner. The steel ball 31 seats on jewel 30 and is confined between this jewel and a second cup jewel 32 secured to the lower surface of an upper mounting 34 and preferably recessed therein. This upper mounting 34 is provided with a centrally located conical bore 35, and, as shown, the lower end of spindle 5 is reduced in diameter as indicated at 36, and is provided with a conical tip or extension 37 which is adapted to frictionally engage in conical bore 35 of upper mounting 34. The conical bore 35 is accurately constructed with respect to conical tip or end 37 of spindle 5 so as to continually maintain upper mounting 34 accurately in line with spindle 5.

The upper bearing mounting 34 is confined within a central longitudinal bore 38 which extends upwardly from the lower end of a sleeve or housing portion 19a. The outside of this sleeve is reduced in diameter as indicated at 40, and such reduced portion is provided with external threads 41 for cooperation with internal threads 42 formed in bore 23 of bearing screw 19. On its upper surface sleeve 19a is provided with a depressed opening 43 having conical side walls 44 through which portion 37 of spindle 5 extends to engage upper bearing mounting 34. The conical side walls 44 of sleeve 19a assist in guiding conical pivot 37 of spindle 5 into upper bearing mounting 34, whereby conical portion 37 will always be certain to drop into conical bore 35 of such mounting in the assembly of the construction.

The bottom edge of the sleeve or housing extension 19a forms an abutment shoulder 45 for cooperating with the abutment shoulder 29 on the lower bearing mounting 27, whereby to limit the upward spring-pressed motion of said lower bearing mounting. An internal annular flange 46 in the upper end of said housing extension forms a retaining shoulder for cooperating with a retaining shoulder 47 on the upper end of the upper bearing mounting 34, these two shoulders being out of contact with each other during the normal operation of the meter.

The lower screw portion 19 and the upper sleeve portion 19a constitute the two separable sections of a tubular cage or bearing housing in which all parts of the bearing assembly are retained in self-contained or unit form. Upper bearing mounting 34 cannot move upwardly beyond the shoulder 46 of sleeve 19a, so that such sleeve will retain the various parts of the bearing system in proper relation within the bearing housing or cage 19, 19a regardless of how the bearing assembly may be handled. Sufficient space is provided between the bore of sleeve 19a and the outer surface of upper bearing mounting 34 so as to completely space the moving system from the sleeve 19a during normal operation of the meter. Under severe loads, upper bearing mounting 34 may come into lateral contact with sleeve 19a, although this only occurs under abnormal conditions when the effect on the meter accuracy is relatively small. The cushion spring 24 normally forces lower mounting member 27 upwardly until cup jewel 30 is disposed within bore 38 of sleeve 19a and shoulder 29 of said mounting engages the lower peripheral shoulder 45 of said sleeve. The normal engagement of shoulder 29 of the lower mounting member 27 against the lower shoulder 45 of the upper cage member or sleeve 19a holds the lower mounting member 27 and its bearing 30 in proper vertical alignment with the upper mounting member 34 and its bearing 32. As before remarked, the upper shoulder 47 of the upper bearing mounting 34 is normally spaced slightly from the internal retaining shoulder 46 of the sleeve member 19a, this space being indicated at 48. Preferably, said space is sufficiently small so that even if some jar should cause the upper bearing mounting 34 to move upwardly through this space into contact with the internal retaining shoulder 46, the upper bearing jewel 32 will not be elevated sufficiently high to allow the ball 31 to escape laterally from its properly centered position between the two jewels. Thus, the ball cannot accidentally be jarred out of place so as to become caught between the adjacent edges 49 of the two bearing mountings. When the meter is subjected to shocks causing a downward movement of the moving system, it will be apparent that spindle 5, together with the upper and lower mounting members 34 and 27, respectively, may be moved downwardly against the action of compression spring 24, thereby preventing any damage to the bearing surfaces. Upon removal of the abnormal condition, compression spring 24 will move the bearing mountings and the spindle back to their normal operative positions.

If desired, spindle 5 may be provided with a shoulder 50, which extends outwardly therefrom as shown in Figure 3 of the drawing. This shoulder is adapted to contact upper bearing housing 19a and limit the downward movement of the spindle when the meter is subjected to abnormal shocks. Preferably, shoulder 50 is so positioned upon spindle 5 that it will contact upper bearing housing 19a before compression spring 24 goes "solid". With such an arrangement, compression spring 24 will still have a slight yielding movement after shoulder 50 of the spindle contacts upper bearing housing 19a, and there will be no danger of spindle 5 jamming the steel ball 31 between the bearing mountings and thereby marring the surfaces of the cup jewels, and which might happen if the spring 24 should go "solid" under the influence of an excessive shock to the meter.

While preferred embodiments of the invention have been illustrated and described, by way of example, it will be obvious that changes may be made therein within the spirit and scope of the invention and, therefore, the invention is not to be limited to the forms herein disclosed, except insofar as it may be so limited in the appended claims.

I claim:

1. In combination with an electricity meter comprising a spindle, a disk secured to said spindle, means for rotating said disk and spindle, and means pivotally supporting the upper end of said spindle, of means pivotally supporting the lower end of said spindle comprising a bearing housing including upper and lower housing members, said upper housing member having its lower end reduced in diameter and secured within and forming an abutment shoulder in said lower housing member, a bearing assembly within said bearing housing comprising a lower mounting member disposed in said lower housing member and an upper mounting member disposed in said upper housing member, jewels secured to said mounting members, a ball disposed between said jewels, means confined entirely in said lower housing member and normally urging said lower mounting member upwardly with respect to said lower housing member, a shoulder formed on said lower mounting member, said latter shoulder directly engaging the abutment shoulder on said upper housing member and limiting upward movement of said lower mounting member with respect to said lower housing member, a conical portion formed on said spindle, a conical bore formed in said upper mounting member, the conical portion on said spindle being adapted to engage in the conical bore in said upper mounting member for supporting the lower end of said spindle thereon, and means formed on said upper mounting member for guiding said spindle into engagement with the bore in said upper mounting member.

2. In combination with an electricity meter comprising a spindle, a pivot carried by the lower end of said spindle, a disk secured to said spindle, means for rotating said disk and spindle, and means pivotally supporting the upper end of said spindle, of means pivotally supporting the lower end of said spindle comprising a bearing housing including upper and lower housing members secured together, said upper housing member having an opening at one end thereof, a bearing assembly within said bearing housing comprising a lower bearing mounting disposed in said lower housing member, and an upper bearing mounting disposed in said upper housing member, jewels secured to said mounting members, a ball disposed between said jewels, said pivot being normally entirely free of said bearing assembly but insertable into said upper housing member through the open end thereof and into engagement with said upper mounting member, means in said lower housing member normally urging said mounting members upwardly with respect to said housing members and said upper mounting member into engagement with said pivot, said means permitting said mounting members and said spindle to move downwardly under the influence of abnormal shocks to said meter, and a shoulder carried by said spindle and engageable with said upper housing member for limiting the downward movement of said spindle.

3. In combination with an electricity meter comprising a spindle, a pivot carried by the lower end of said spindle, a disk secured to said spindle, means for rotating said disk and spindle, and means pivotally supporting the upper end of said spindle, of means pivotally supporting the lower end of said spindle comprising a bearing housing including upper and lower housing members secured together, said upper housing member having an opening at one end thereof, a bearing assembly within said bearing housing comprising a lower bearing mounting disposed in said lower housing member, and an upper bearing mounting disposed in said upper housing member, jewels secured to said mounting members, a ball disposed between said jewels, said pivot being normally entirely free of said bearing assembly but insertable into said upper housing member through the opening therein and into engagement with said upper mounting member, spring means in said lower housing member normally urging said mounting members upwardly with respect to said housing members and said upper mounting member into engagement with said pivot, cooperating means formed on said upper housing member and said lower mounting member for limiting upward movement of said mounting members, said spring means permitting said mounting members and said spindle to move downwardly under the influence of abnormal shocks to said meter, and a shoulder formed on said spindle and engageable with said upper housing member for limiting the downward movement of said spindle.

4. A pivotal mounting for electrical measuring instruments comprising a bearing housing including upper and lower housing members secured together, said lower housing member being adapted to be directly carried by a stationary portion of the instrument, a bearing assembly within said bearing housing comprising a lower mounting member disposed in said lower housing member and an upper mounting member disposed in said upper housing member, jewels secured to said mounting members, a ball disposed between said jewels, means confined entirely within said lower housing member normally urging said mounting members upwardly with respect to said housing members, and means on said upper housing member directly engaging said lower mounting member for limiting upward movement of said mounting member with respect to said lower housing member.

5. A pivotal mounting for electrical measuring instruments comprising a bearing housing including upper and lower housing members secured together, said lower housing member being adapted to be directly carried by a stationary portion of the instrument, a bearing assembly within said bearing housing comprising a lower mounting member disposed in said lower housing member and an upper mounting member disposed in said upper housing member, jewels secured to said mounting members, a ball disposed between said jewels, means confined entirely within said lower housing member normally urging said mounting members upwardly with respect to said housing members, a shoulder formed on said upper housing member, and a shoulder formed on said lower mounting member, said shoulders directly engaging and limiting upward movement of said lower mounting member with respect to said lower housing member.

6. A pivotal mounting for electrical measuring instruments comprising a bearing housing including upper and lower housing members, said lower housing member being adapted to be directly carried by a stationary portion of the instrument, said upper housing member having its lower end reduced in diameter and secured within and forming an abutment shoulder in said lower housing member, a bearing assembly within said bearing housing comprising upper and lower mounting members, jewels secured to said mounting members, a ball disposed between said jewels, means confined within said lower housing member normally urging said lower mounting member upwardly with respect to said bearing housing, and means on said lower mounting member directly engaging said abutment shoulder for limiting upward movement of said lower mounting member with respect to said lower housing member.

7. A pivotal mounting for electrical measuring instruments comprising a bearing housing including upper and lower housing members, said lower housing member being adapted to be directly carried by a stationary portion of the instrument, said upper housing member having its lower end reduced in diameter and secured within and forming an abutment shoulder in said lower housing member, a bearing assembly within said bearing housing comprising a lower mounting member disposed in said lower housing member and an upper mounting member disposed in said upper housing member, jewels secured to said mounting members, a ball disposed between said jewels, means confined entirely within said lower housing member and normally urging said lower mounting member upwardly with respect to said bearing housing, and a shoulder formed on said lower mounting member and directly engaging the abutment shoulder on said upper housing member for limiting upward movement of said lower mounting member with respect to said lower housing member.

8. In combination with an electricity meter comprising a spindle, a conical pivot carried by the lower end of said spindle, and means pivotally supporting the upper end of said spindle, of means pivotally supporting the lower end of said spindle comprising upper and lower housing members secured together, said upper housing member having an opening therein, and said lower housing member being directly carried by a stationary portion of said meter, a bearing assembly within said bearing housing comprising a lower bearing mounting disposed in said lower housing member, and an upper bearing mounting having a conical bore formed therein disposed in said upper housing member, jewels secured to said mounting members, a ball disposed between said jewels, said pivot being normally entirely free of said upper bearing mounting but insertable into said upper housing member through the open end thereof and into engagement with the conical bore in said upper bearing mounting, and means confined within said bearing housing and yieldingly urging said bearing assembly upwardly into engagement with said pivot.

9. The combination with an electricity meter comprising a frame, a rotatable spindle, and means pivotally supporting the upper end of said spindle, of a bearing assembly for pivotally supporting the lower end of said spindle comprising a housing, two jewels and an interposed ball disposed in said housing, said housing including means restraining movement of said jewels and ball therefrom whereby said bearing assembly may be inserted into or withdrawn from the frame of the meter as a unit, and a mounting member associated with one of said jewels and confined entirely within said housing, said mounting member having a socket formed therein adapted to frictionally receive said spindle and automatically engageable or disengageable with said spindle by the mere act of inserting said bearing assembly into said frame or withdrawing it therefrom, respectively.

10. The combination with an electricity meter comprising a frame, a rotatable spindle, and means pivotally supporting the upper end of said spindle, of a bearing assembly for pivotally supporting the lower end of said spindle, comprising a housing, two jewels, and an interposed ball disposed in said housing, means confined within and yieldably supporting said jewels and ball within said housing, said housing including means restraining movement of said jewels and ball and said last named means therefrom, whereby said bearing assembly may be inserted into or withdrawn from the frame of the meter as a unit, and a mounting member associated with one of said jewels and confined entirely within said housing, said mounting member having a socket formed therein adapted to frictionally receive said spindle and automatically engageable or disengageable with said spindle by the mere act of inserting said bearing assembly into said frame or withdrawing it therefrom, respectively.

FRED KURZ.